(12) United States Patent
Mousavian et al.

(10) Patent No.: US 10,580,158 B1
(45) Date of Patent: Mar. 3, 2020

(54) DENSE DEPTH ESTIMATION OF IMAGE DATA

(71) Applicant: Zoox, Inc., Menlo Park, CA (US)

(72) Inventors: Arsalan Mousavian, Fairfax, VA (US); James William Vaisey Philbin, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 116 days.

(21) Appl. No.: 15/803,682

(22) Filed: Nov. 3, 2017

(51) Int. Cl.
| | |
|---|---|
| *G05D 1/10* | (2006.01) |
| *G06T 7/593* | (2017.01) |
| *G06T 7/70* | (2017.01) |
| *G06K 9/66* | (2006.01) |
| *G06N 20/00* | (2019.01) |

(52) U.S. Cl.
CPC ............ *G06T 7/70* (2017.01); *G06K 9/66* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2015/0363940 A1* | 12/2015 | Held | G06T 7/277 382/107 |
| 2017/0032222 A1* | 2/2017 | Sharma | G06K 9/6256 |
| 2018/0060674 A1* | 3/2018 | Zhao | B60W 40/06 |
| 2019/0050000 A1* | 2/2019 | Kennedy | G05D 1/101 |

* cited by examiner

*Primary Examiner* — Iman K Kholdebarin
(74) *Attorney, Agent, or Firm* — Lee & Hayes, P.C.

(57) ABSTRACT

Systems, devices, and methods are described for generating dense depth estimates, and confidence values associated with such depth estimates, from image data. A machine learning algorithm can be trained using image data and associated depth values captured by one or more LIDAR sensors providing a ground truth. When the algorithm is deployed in a machine vision system, image data and/or depth data can be used to determine dense depth estimates for all pixels of the image data, as well as confidence values for each depth estimate. Such confidence values may be indicative of how confident the machine learned algorithm is of the associated depth estimate.

20 Claims, 5 Drawing Sheets

DENSE DEPTH ESTIMATION OF IMAGE DATA

BACKGROUND

Cameras capture image data to recreate a scene of an environment. Some cameras, such as stereoscopic cameras or time-of-flight cameras, can capture or determine some depth information based on image data, although such specialized cameras can be difficult to align or calibrate, can have limited range, or can suffer from inaccurate depth information.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
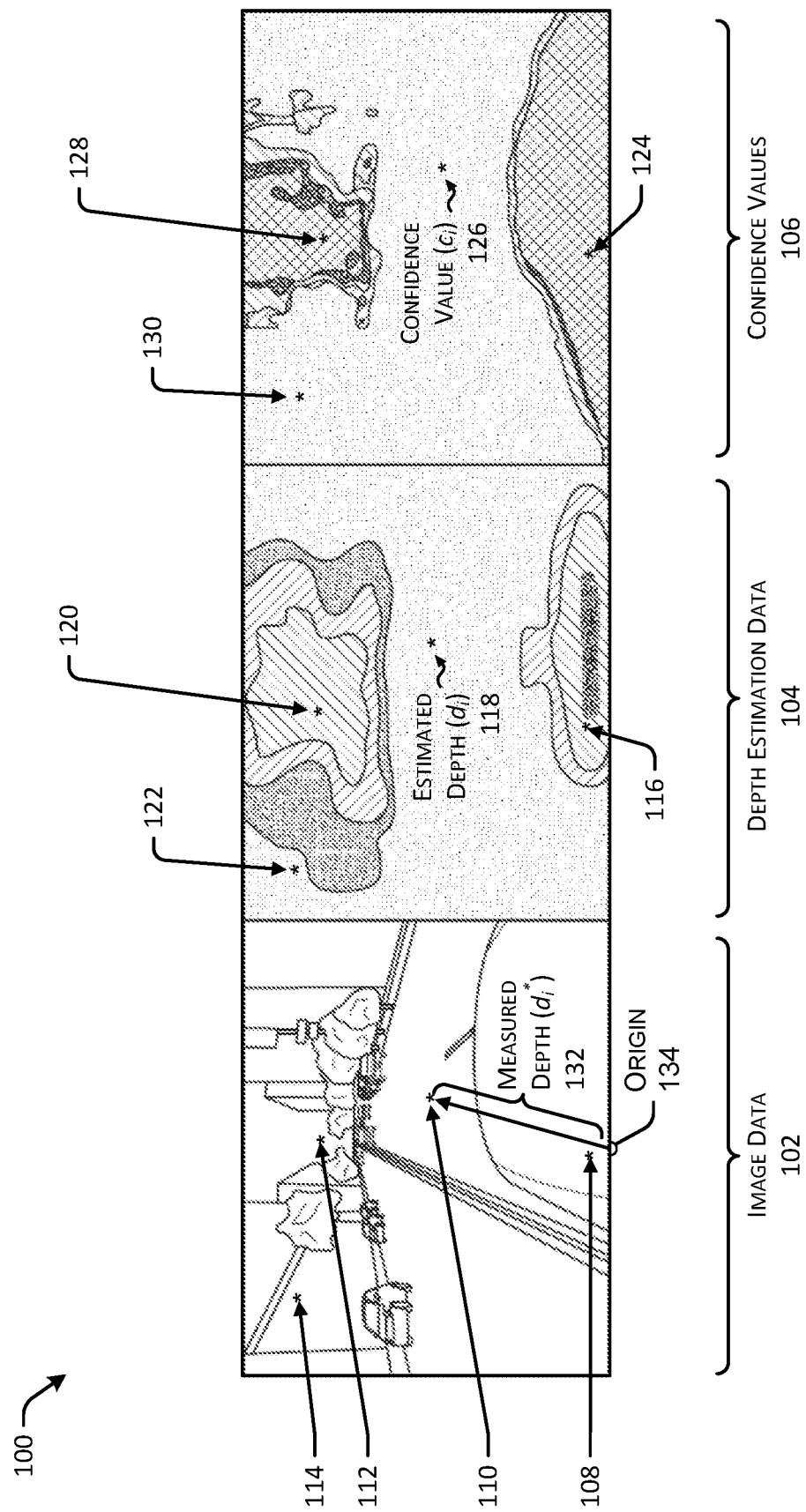
FIG. 1 illustrates examples of image data, depth estimation data, and confidence values, respectively, in accordance with embodiments of the disclosure.

This disclosure describes methods, apparatuses, and systems for generating depth estimates and associated confidence values for image data. For example, image data can be captured including RGB (red-green-blue) data associated with individual pixels. The image data can be input to a machine learned algorithm that has been trained with image data and LIDAR data as a ground truth representing measured depth values to determine depth estimates and an associated confidence value for each pixel. Thus, the methods, apparatuses, and systems discussed herein can be used to generate depth estimates for each pixel corresponding to a distance between the image sensor capturing the image data (or another reference point) and the object represented by each pixel of image data. Accordingly, such image data and associated depth estimates and confidence values can be provided to other computer vision systems or components of an autonomous vehicle for subsequent processing, including but not limited to segmentation, classification, trajectory generation for an autonomous vehicle, and the like.

As introduced above, a machine learning algorithm can be trained to be configured to determine such depth estimates and confidence values based on sensor data. Such sensor data can include image sensor data and/or LIDAR data. That is, in some instances, image data alone can be provided to a machine learned algorithm to determine the depth estimates and confidence values. In other instances, image data and LIDAR data can be provided to a machine learned algorithm to determine the depth estimates and confidence values.

The machine learning algorithm can be trained using image data and LIDAR data as a ground truth for the depth estimates. In some instances, the image data can include data at a higher resolution compared to LIDAR data. For example, the image data may include data from three channels (e.g., red, green, blue) each having millions of pixels, while LIDAR data corresponding to the image data may include on the order of only hundreds of thousands of points, or fewer. Of course, these example values are merely representative and are not intended to be limiting. Thus, based on the disparity between the image data and the amount of corresponding LIDAR data, it can be understood that certain pixels of image data may not have a corresponding LIDAR measurement. In some instances, the operations discussed herein can provide dense depth estimates corresponding to the image data, such that some or all of the individual pixels of the image data can be associated with a depth estimate. Further, each depth estimate can be associated with a confidence value generated by the machine learned algorithm, for example, indicating a certainty of the depth estimate.

In some instances, a machine learning algorithm can be trained using five channels of data, whereby three channels can correspond to the RGB data, one channel can correspond to a binary indication (e.g., a binary channel) whether LIDAR (or other depth data) is available for a particular pixel, and one channel can correspond to a depth measurement, if any, associated with the particular pixel. In some instances, the depth measurement can be considered a ground truth for the depth estimate, with the machine learning algorithm being trained to determine a depth estimate to minimize a difference between the ground truth and the depth estimate. Of course, any number of channels and/or type(s) of data can be used for training a machine learning algorithm and as input to a deployed machine learned algorithm. As a non-limiting example, in some instances, the binary channel may be omitted.

Upon training the machine learning algorithm (e.g., a machine learned algorithm), such a machine learned algorithm can receive data captured by image sensor(s) and/or LIDAR sensor(s) to determine depth estimates and confidence values associated with image data. In some cases, the depth estimates and confidence values can be stored in a data structure such that, for a particular pixel, the depth estimate or the measured depth value (e.g., determined by the LIDAR sensor(s) or other depth measurement sensors) can be selectively accessed for subsequent processing. For example, some applications or systems of an autonomous vehicle can use the depth estimates and/or confidence values for segmentation and/or classification, while other applications (e.g., a planner system for the autonomous vehicle) may be configured to use the measured depth values. Of course, these applications are examples, and such examples and uses of depth estimates or measured depth values is not intended to be limiting.

The depth estimation techniques described herein can improve a functioning of a computing device by providing additional depth data and confidence values for performing subsequent machine vision operations. For example, having depth estimates and confidence values associated with image data may allow subsequent processes such as segmentation, classification, route planning, trajectory generation, and the like to be performed more accurately, may require less processing power, and/or may require less memory. For example, in some instances, faster and/or more accurate segmentation may be utilized in generating a trajectory of an autonomous vehicle, which may improve safety for occupants of an autonomous vehicle. These and other improvements to the functioning of the computer are discussed herein.

In some instances, the techniques discussed herein can be implemented in a system including image sensor(s) (e.g., RGB cameras), depth cameras (e.g., RGB-D cameras (e.g., time-of-flight cameras)), RADAR sensors, SONAR sensors, and the like, to provide redundancy to the system in the event of hardware or software failure. For example, in the event that a depth camera is occluded or broken, the techniques discussed herein can be used with an image sensor to provide redundancy and/or backup to ensure that dense depth information can be available under many circumstances. Thus, the techniques discussed herein provide additional improvements to machine vision systems, for example.

The methods, apparatuses, and systems described herein can be implemented in a number of ways. Example implementations are provided below with reference to the following figures. Although discussed in the context of an autonomous vehicle, the methods, apparatuses, and systems described herein can be applied to a variety of systems using machine vision, and is not limited to autonomous vehicles. Further, although described in connection with three-dimensional LIDAR data, the methods, apparatuses, and systems described herein are not limited to three-dimensional data, and are not limited to LIDAR data. In one example, the methods, apparatuses, and systems may be utilized in a two-dimensional context with RADAR data, or used with horizontal LIDAR data. For example, the methods, apparatuses, and systems may be utilized in a manufacturing assembly line context, or in an aerial surveying context. Further, the datasets may include data from stereoscopic cameras, depth cameras, RADAR sensors, acoustic sensors, etc., and may include any number of layers or channels, which may correspond to any number of dimensions. Additionally, the techniques described herein may be used with real data (e.g., captured using sensor(s)), simulated data (e.g., generated by a simulator), or any combination of the two.

FIG. 1 illustrates an example 100 of image data 102, depth estimation data 104, and confidence values 106, respectively, in accordance with embodiments of the disclosure.

For example, the image data 102 can be captured by an image sensor mounted on a vehicle, such as an autonomous vehicle. Accordingly, an individual image of the image data 102 can represent any environment where a vehicle can operate. In this example 100, the image data 102 represents a scene of an autonomous vehicle driving on a roadway. The image data 102 can include a representation of a portion of a vehicle 108 (e.g., a hood of the vehicle 108 if the image sensor is mounted on a roof of the vehicle 108). Further, the image data 102 can include a representation of a roadway 110, sky 112, and one or more buildings 114 proximate to the roadway 110. Of course, and as discussed above, the systems, methods, and apparatuses discussed herein can be used in any context utilizing machine vision, and accordingly, the image data 102 can represent virtually any scene or environment.

By way of example, and without limitation, a portion of the representation of the roadway 110 can be associated with a single pixel indicated as "*" in the image data 102 (also referred to as pixel i). In some instances, pixel i can be associated with a measured depth ($d_i^*$) 132. As can be understood in the context of this disclosure, the measured depth 132 (also referred to as a measured distance) can represent a distance between an origin 134 (e.g., a LIDAR sensor or a virtual origin based on a "metaspin" representing data from a plurality of LIDAR sensors) and an object represented by pixel i, which in this case, is the roadway 110.

The depth estimation data 104 and the confidence values 106 represent outputs of the systems, methods, and apparatuses discussed herein. In some instances, the depth estimation data 104 can represent a dense depth estimation of the image data 102, such that each pixel of the image data 102 can be associated with an individual depth estimate and a confidence value. By way of example, if the image data 102 represents an image size of 10×10 pixels (e.g., 100 pixels), the depth estimation data 104 can represent 100 depth estimates, and the confidence values 106 can represent 100 confidence values. Of course, the numbers discussed herein are merely illustrative, and are not intended to be limiting.

In some instances, a "coloring" or a "shading" of the elements in the depth estimation data 104 can represent a value of the estimated depth, while a location of the estimated depth indicates that the estimated depth corresponds to the same location of the image data 102.

The depth estimation data 104 includes a plurality of depth estimates 116, 118, 120, and 122, which may correspond to the vehicle 108, the roadway 110, the sky 112, and the one or more buildings 114, respectively. In some instances, the depth estimates 116, 118, 120, and 122 can each correspond to a single pixel associated with the vehicle 108, the roadway 110, the sky 112, and the one or more buildings 114, respectively. In any event, the depth estimates 116, 118, 120, and 122 can represent depth estimates associated with a corresponding pixel in the image data 102. By way of example, the depth estimate 116 can correspond to a relatively low depth estimate (as the depth estimate 116 corresponds to a pixel of the vehicle 108). In some instance, the reference to a "low" depth estimate can correspond to a relative distance between a origin and an object represented by a respective pixel. Similarly, as discussed below, an "intermediate" or "high" depth estimate can correspond to a distance between an origin and an object represented in an image.

In some instances, the depth estimate 118 (also illustrated as the estimated distance $d_i$) can correspond to an intermediate depth estimate (as the depth estimate 118 can correspond to a pixel of the roadway 110). In some instances, the depth estimate 120 can correspond to a relatively high depth estimate (as the depth estimate 120 can correspond to a pixel of the sky 112). And in some instances, the depth estimate 122 can correspond to an intermediate depth estimate (which may be different than the intermediate depth estimate discussed above with respect to the depth estimate 118) (as the depth estimate 122 can correspond to a pixel of the one or more buildings 114). In some instances, the depth estimation data 104 can be provided as a data structure, although in some instances, the data structure can be represented as an image with coloring (or in the case of a single channel image, an intensity) associated with the depth values of the depth estimate.

The confidence values 106 can include a plurality of confidence values 124, 126, 128, and 130, which may correspond to the depth estimates 116, 118, 120, and 122, respectively. That is, an individual confidence value of the confidence values 106 can correspond to an individual depth estimate of the depth estimation data 104. As such, the confidence values 106 may indicate how confident the system is that depth estimation 104 is accurate. In some instances, the model/algorithm (discussed below with respect to FIG. 2, and throughout this disclosure), can generate confidence values 106 between zero and one, whereby a confidence value of zero corresponds to an estimate without any confidence, and a confidence value of one corresponds to an estimate that is completely certain (e.g., high confidence). Of course, any range of confidence values can be used, and the range from zero to one is merely an example.

In some instances, the model/algorithm discussed herein can be trained to return low confidence values for the vehicle 108 (e.g., corresponding to the confidence value 124) and for the sky 112 (e.g., corresponding to the confidence value 128). In some instances, these low confidence values can correspond to zero. For example, with respect to depth measurements associated with pixels representing a vehicle 108, the depth measurements may be a result of reflections or errors in calibrations between an image sensor and a depth sensor (e.g., a LIDAR sensor). Further, a number of depth measurements associated with the vehicle 108 may be relatively low, which can encourage confidence values to be low for corresponding depth estimates. In some instances, the confidence values 106 can be roughly proportional to a distance of an individual pixel to an image sensor, LIDAR sensor, or origin (e.g., the origin 134) associated with the vehicle 108, although the precise confidence values 106 are determined according to the techniques discussed herein.

Additional details of the image data 102, the depth estimation data 104, and the confidence values 106 are provided in connection with FIG. 2, below, and throughout this disclosure.

Figure 2:
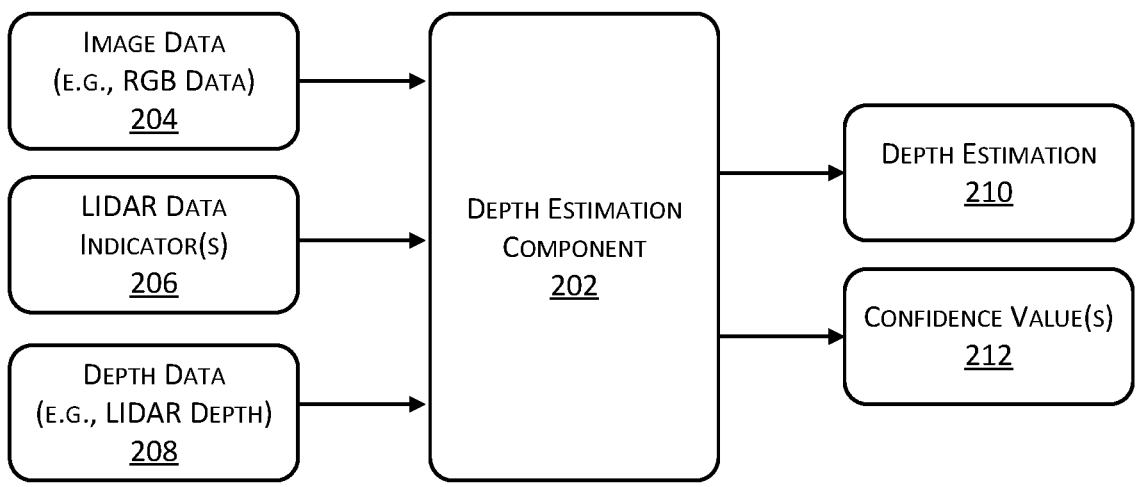
FIG. 2 illustrates an example architecture for implementing the techniques for dense depth estimation of image data.

FIG. 2 illustrates an example architecture 200 for implementing the techniques for dense depth estimation of image data. For example, the architecture 200 includes a depth estimation component 202 receiving image data 204, LIDAR data indicator(s) 206, and depth data 208. Further, based at least in part on receiving the image data 204, the LIDAR data indicators 206, and the depth data 208, the depth estimation component 202 can generate or otherwise determine a depth estimation 210 and confidence value(s) 212 associated with the image data 204, as discussed herein.

In some instances, the architecture 200 may represent an architecture that can be used to train the depth estimation component 202, and in some instances the architecture may represent an architecture that can be implemented in a machine vision system, such as an autonomous vehicle, to generate depth estimates and confidence values, as discussed herein.

In some instances, the depth estimation component 202 may include any models, algorithms, and/or machine learning algorithms. In some instances, the depth estimation component 202 may be implemented as a neural network.

As described herein, an exemplary neural network is a biologically inspired algorithm which passes input data through a series of connected layers to produce an output. One example of a neural network may include a convolutional neural network, or CNN. Each layer in a CNN may also comprise another CNN, or may comprise any number of layers. As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, and the like.

As discussed above, the depth estimation component 202 can receive various inputs, such as the image data 204, the LIDAR data indicator(s) 206, and the depth data 208, to determine an algorithm that can produce depth estimates and confidence values.

The image data 204 can represent any type of image data captured using an image sensor. For example, the image data 204 can represent RGB (red-green-blue) data captured by one or more image sensors installed on an autonomous vehicle. In some instances, the image data 204 can include any number of images at any frame rate. In some instances, the image data 204 can include pixels, image elements, or vector images in any format.

The LIDAR data indicator(s) 206 (also referred to as a depth value indicator) can represent an indication of whether a particular pixel of image data includes corresponding LIDAR data (or corresponding depth data). Such correspondence may be determined, for example, by a transformation including projecting the LIDAR (or depth) point into the camera frame. In some instances, the LIDAR data (or corresponding depth data) can be mapped or projected onto the image data to determine if and where such depth data corresponds to or is associated with image data. For example, if a particular pixel of image data has associated LIDAR data, the LIDAR data indicator 206 for that pixel may have a value of "1", while if the particular pixel of image data does not have associated LIDAR data, the LIDAR data indicator 206 for that pixel may have a value of "0". In some instances, the LIDAR data indicator(s) 206 can correspond to any data type (e.g., RADAR, time-of-flight measurement, SONAR, etc.) associated with the depth data 208, and is not necessarily limited to LIDAR data. That is, in some instances, the depth data 208 can represent data captured by one or more LIDAR sensors, one or more RADAR sensors, one or more time-of-flight sensors, one or more SONAR sensors, and the like. In some instances, the LIDAR data indicator(s) may be optional. That is, in some examples, such binary information may be determined based on the depth data 208 directly.

The depth data 208 can correspond to depth measurements captured by one or more LIDAR sensors, as discussed herein. In some instances, the depth data 208 can correspond to LIDAR data capturing a scene of an environment that substantially corresponds to the environment represented in the image data 204. Further, the depth data 208 can substantially correspond to the instant in time represented by the image data 204. Of course, there may be some variation in time between capturing the image data 204 and the depth data 208. In some instances, the depth estimation data 210 and/or the confidence value(s) 212 can be based at least in part on a time difference between capturing the image data 204 and capturing the depth data 208. In some instances, the depth data 208 may represent a "metaspin" of LIDAR data corresponding to LIDAR data aggregated from a plurality of LIDAR sensors.

In some instances, the depth data 208 can represent a value between zero and one that is normalized based on an upper limit of the depth sensors. For example, for a LIDAR sensor with a maximum usable range of 120 meters (or any value, as understood herein), a depth value of 120 meters can be normalized to a depth data value of "1". Continuing with the example where a maximum range is 120 meters, a depth value of 60 meters can be normalized to a depth data value of "0.5".

In some instances, the image data 204, the LIDAR data indicator(s) 206, and the depth data 208 can represent five channels of data input to the depth estimation component 202 to train the machine learning algorithm to determine the depth estimation 210 and confidence value(s) 212. In some instances, for a first pixel associated with location data (e.g., corresponding to uv-locations of the image data), the five channels of data may be represented by an array of data such as (R, G, B, LIDAR indicator, depth data). That is, the five channels of data may be input to the depth estimation component 202 for training and subsequently, for generation of depth estimation 210 and the confidence value(s) 212.

In some instances, the depth estimation 210 and the confidence values 212 can correspond to the depth estimation data 104 and the confidence values 106, as illustrated in FIG. 1.

Where the depth estimation component 202 is implemented as a neural network, the depth estimation component 202 can include a loss function upon which parameters in the neural network can be based. By way of example, and without limitation, an example loss function is provided below:

$$\text{Loss Function} = \Sigma_{i \in LIDAR} c_i(d_i - d_i^*)^2 - w\Sigma_{\forall j \in pixels} \log(c_j) \quad (1)$$

In the example loss function presented above, $d_i$ corresponds to an estimated depth value for pixel i; $d_i^*$ corresponds to the ground truth depth value for pixel i; and $c_j$ corresponds to the confidence level for pixel i.

The w term corresponds to a tunable parameter that controls aspects of the model, and in particular, that encourages the model to determine confidence values for pixels. In some instances, as w→∞, the model outputs a confidence value $c_j$=1 for all pixels. In some instances, as w→0, the model outputs a confidence value $c_j$=0 for all pixels. In some instances, an exemplary value can be used: w=0.001.

As can be understood, the first summation term in the loss function (e.g., $\Sigma_{i \in LIDAR} c_i(d_i-d_i^*)^2$) is evaluated only for pixels of image data that are associated with depth data (e.g., LIDAR measurements), while the second summation term (e.g., $-w\Sigma_{\forall j \in pixels} \log(c_j)$) is evaluated for all pixels in the image data.

Of course, a variety of loss functions can be implemented in the depth estimation component 202, and the example in equation (1) is not intended to be limiting.

Further, in some instances, the depth estimation component 202 can include one or more activation functions as one or more layers in the depth estimation component 202. For example, the depth estimation 210 can be based at least in part on a rectified linear unit (ReLU) activation function. In some instances, the confidence value(s) 212 can be based at least in part on a Sigmoid activation function. In some instances, the ReLU activation function and/or the Sigmoid activation function can be included in the depth estimation component 202 as a layer of a neural network. Of course, these example activation functions are not intended to be limiting, and any activation function can be used in the depth estimation component 202.

Figure 3:
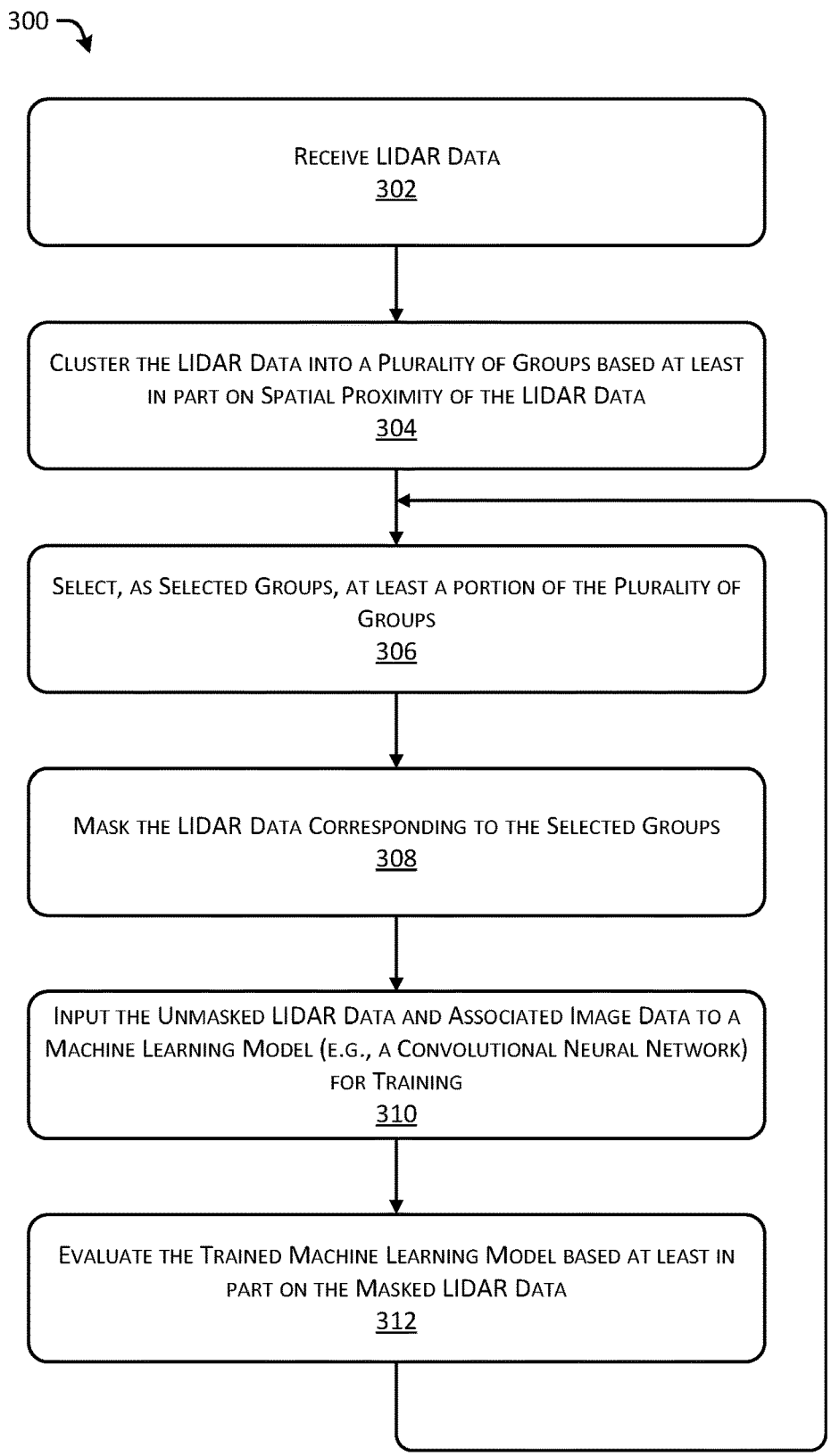
FIG. 3 depicts an example process for masking LIDAR data for training to determine a machine learned algorithm, as discussed herein.
Figure 4:
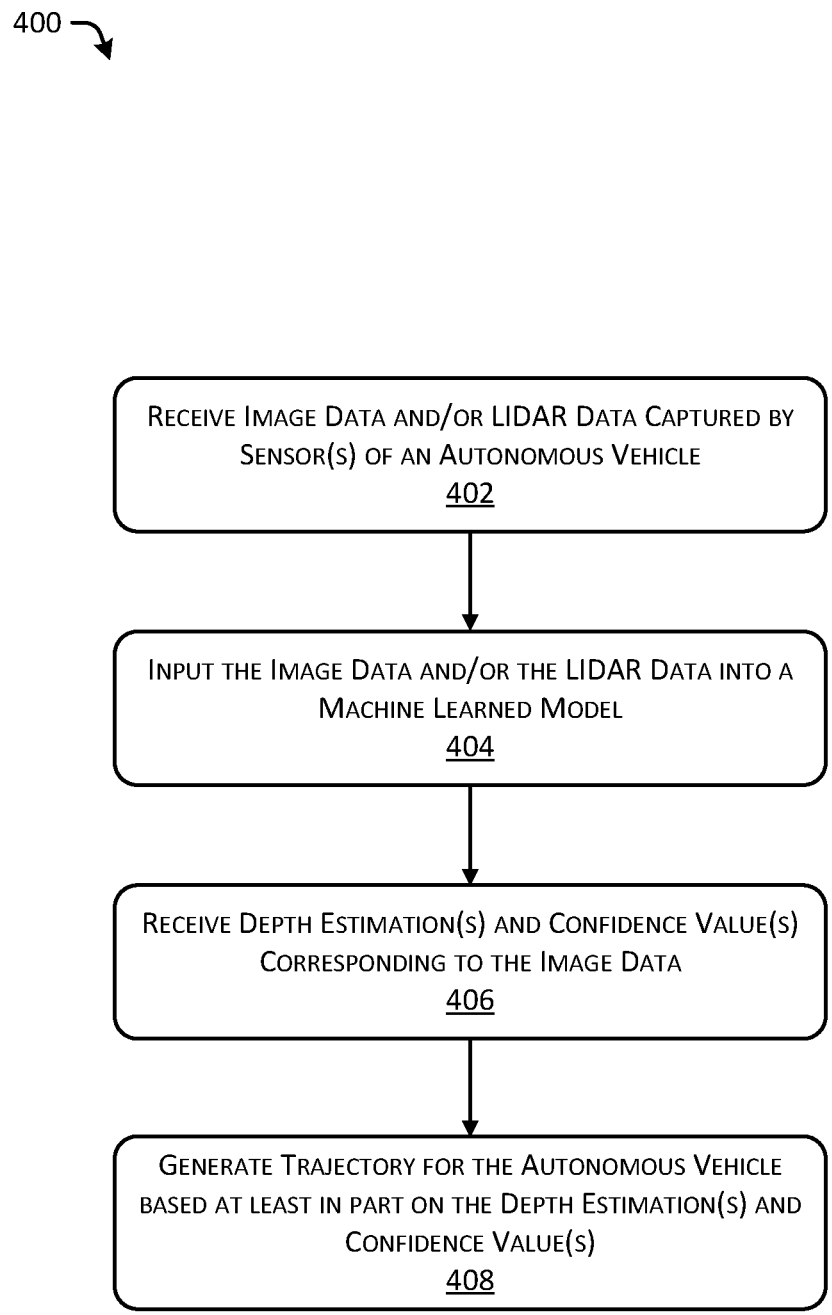
FIG. 4 depicts an example process for determining depth estimates and confidence values based on image data, and generating a trajectory based on the depth estimates and confidence values, as discussed herein.

FIGS. 3 and 4 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 depicts an example process 300 for masking LIDAR data for training to determine a machine learned algorithm, as discussed herein. For example, some or all of the process 300 can be performed by one or more components in the FIG. 2 or 5, as described herein.

At operation 302, the process can include receiving LIDAR data. In some instances, the LIDAR data can be received from one or more LIDAR sensors associated with an autonomous vehicle. In some instances, the LIDAR data may be representative of a "metaspin" including a representation of an environment captured by a plurality of LIDAR sensors. In some instances, the operation 302 can include receiving image data captured by one or more image sensors, whereby the image data corresponds to the scene represented in the LIDAR data. That is, the image data and the LIDAR data can represent the same scene of an environment, namely, taken at a same time with a same or similar perspective. In some instances, the operation 302 can include normalizing the LIDAR data (or representations of the LIDAR data) such that distance represented by the LIDAR data can be between zero and one, with a value of one representing a maximum range of a depth-sensing system. In some instances, the LIDAR can be synthetic (e.g., simulated) data generated by a computer program for testing and/or additional training purposes.

In some instances, the operation 302 can include determining one or more LIDAR indicators (or depth indicators) which provides an indication of whether a particular pixel of image data is associated with a measured depth value (e.g., LIDAR depth data). In some instances, the operation 302 can include receiving depth data from sensors other than LIDAR sensors, such as from RADAR sensors, SONAR sensors, time-of-flight sensors, and the like. Such an association may be accomplished by, for example, projecting a depth point into the image space using known intrinsics and extrinsics for both the camera and LIDAR(s).

At operation 304, the process can include clustering the LIDAR data into a plurality of groups based at least in part on spatial proximity of the LIDAR data. For example, the operation 304 can include using k-means clustering (or any other clustering technique or algorithm) to cluster LIDAR data into individual clusters. As can be understood, individual clusters of LIDAR data can include more or less LIDAR data than other clusters. In some instances, the operation 304 can include assigning a cluster identifier to one or more LIDAR data points to identify LIDAR data as associated with a particular cluster.

At operation 306, the process can include selecting, as selected groups, at least a portion of the plurality of groups. In some instances, the operation 306 can include randomly selecting half of the clusters. In some instances, a number of clusters to be selected as the selected groups can be randomly determined as well.

At operation 308, the process can include masking the LIDAR data corresponding to the selected groups. In some instances, the operation 308 can include adding or associating a flag or indicator to the selected groups. In some instances, masking the LIDAR data (via a flag, indicator, or some other method) can inform the process 300 to ignore or refrain from utilizing the masked LIDAR data in a subsequent training step. As can be understood in the context of this disclosure, LIDAR data that is not masked in the operation 308 can be referred to as unmasked LIDAR data.

At operation 310, the process can include inputting the unmasked LIDAR data and associated image data to a machine learning model (e.g., a convolutional neural network) for training. However, some or all of the LIDAR data can be used as the ground truth for training the machine learning model, while the unmasked data is used as input to the machine learning model. That is, all depth values associated with the LIDAR data can be used for backpropagation when training the machine learning model based on input of only the unmasked portions. For example, the unmasked LIDAR data can be interpreted as the ground truth for the network training to determine depth estimates and confidence values associated with the image data.

At operation 312, the process can include evaluating the trained machine learning model based at least in part on the masked data. For example, in some instances, the operation 312 can include inputting the masked data into the trained machine learning model to determine an estimated depth value and/or confidence level associated with the data. In some instances, the process 300 can iteratively perform operations 306, 308, and 310 to increase an amount of data available for training, to reduce overfitting to a same set of data, and/or to determine a robust machine learned algorithm.

FIG. 4 depicts an example process 400 for determining a depth estimate and confidence value based on image data, and generating a trajectory based on the depth estimates and confidence values, as discussed herein. For example, some or all of the process 400 can be performed by one or more components in the FIG. 2 or 5, as described herein.

At operation 402, the process can include receiving image data and/or LIDAR data captured by one or more sensors of an autonomous vehicle. As discussed herein, the techniques can be implemented in two ways: first, image data alone can be input to an algorithm to determine the depth estimates and confidence values; and second, image data and LIDAR data can be input to an algorithm to determine the depth estimates and confidence values. Of course, based on the implementation of the techniques (or based on an availability of one or more sensors) the operation 402 can include receiving image data and/or LIDAR data. In some instances, the operation 402 can include determining that the image data corresponds to the LIDAR data (e.g., with respect to calibration, alignment, subject matter, perspective, pose, time of data capture, etc.). In some instances, the image data and/or the LIDAR data can be synthetic data or simulated data generated by a computer program for testing and/or additional training purposes. In some instances, the operation 402 can further include determining LIDAR indicators (or depth data indicators) associated with each pixel or data point of the image data to indicate whether depth data is associated with each pixel (or image element, such as in connection with a vector-based image).

At operation 404, the process can include inputting the image data and/or the LIDAR data into a machine learned model. In some instances, the machine learned model can receive five channels of data (e.g., RGB data, LIDAR indicator (or depth data indicator), and depth data) associated with each pixel of an image. Accordingly, the machine learned model can analyze the input data to determine depth estimates and associated confidence values, as discussed herein. In those examples where no depth data is provided, three channels of data (e.g., RGB data) may be input to the machine learned model.

At operation 406, the process can include receiving depth estimation(s) and confidence value(s) corresponding to the image data. For example, for a particular pixel (e.g., associated with a location of an image), the particular pixel can be associated with image data, a depth estimation, and a confidence value associated with the depth estimation. Further, the particular pixel can be associated with a LIDAR indicator (indicating the presence of measured depth data), and the measured depth data, if any. The aforementioned data can be stored in a data structure (e.g., a multi-channel image) such that each layer of information can be accessed based on the particular application.

At operation 408, the process can include generating a trajectory for the autonomous vehicle based at least in part on the depth estimation(s) and the confidence value(s). For example, the image data, depth estimations, and confidence values can be input to a variety of systems of the autonomous vehicle, such as a localization system, a perception system, a prediction system, system controllers, and the like. Based on the output of one or more systems, the operation 408 can include generating a trajectory for the autonomous vehicle to traverse in an environment. In some instances, the operation 408 can include utilizing at least a portion of the image data, the depth estimation(s), and/or the confidence value(s) for path planning, collision avoidance, determining relative differences between objects for predicting object behavior, and the like. As discussed above, the estimated depth values and confidence levels may improve segmentation and/or classification, and/or could improve accuracy and/or robustness of the various systems discussed herein. Accordingly, the techniques can lead to improved real-world benefits such as increased safety or more accurate route generation, to name a few benefits.

Figure 5:
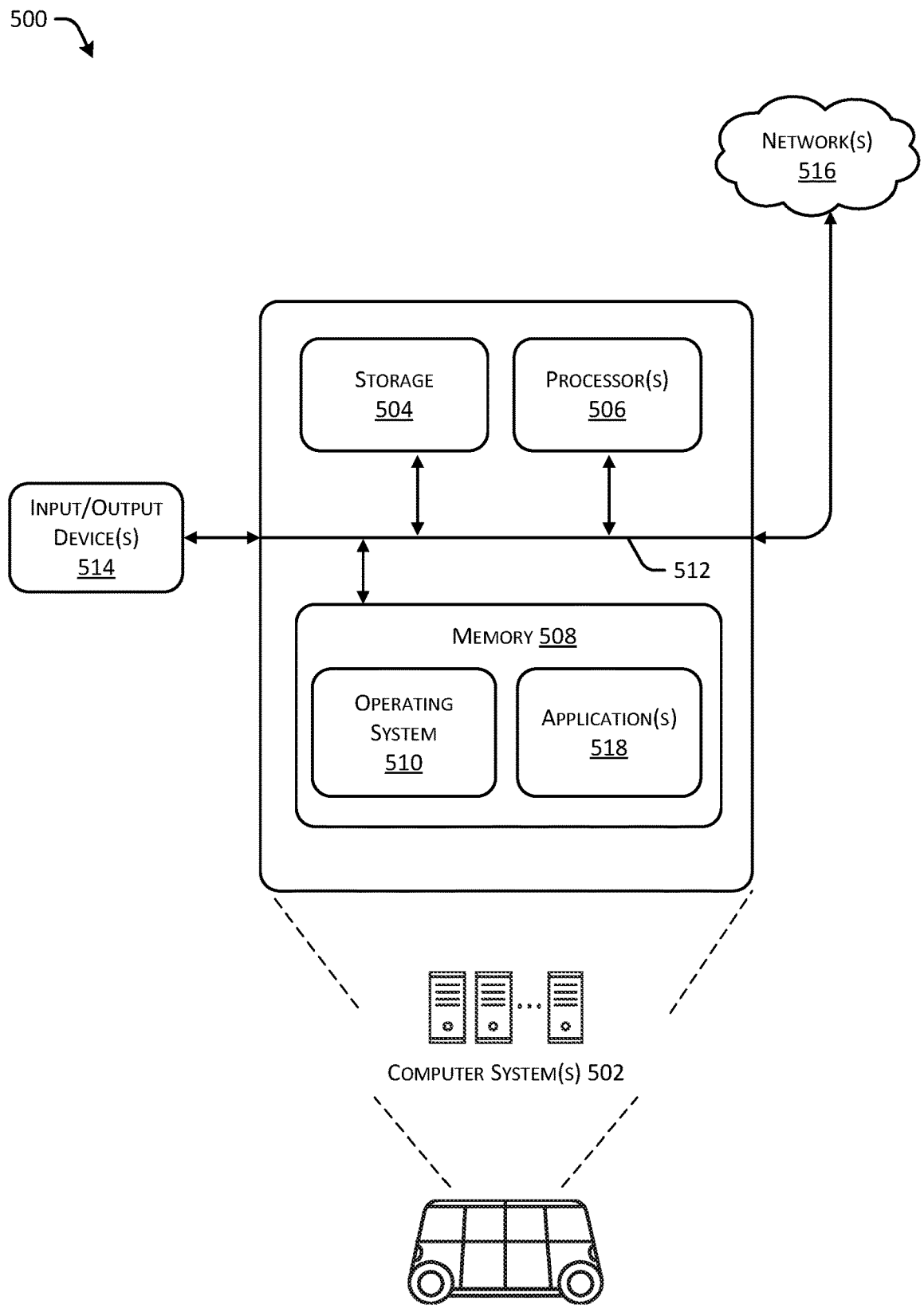
FIG. 5 depicts a block diagram of an example computer system for implementing the techniques described herein.

FIG. 5 illustrates an environment 500 in which the disclosures may be implemented in whole or in part. The environment 500 depicts one or more computer systems 502 that comprise a storage 504, one or more processor(s) 506, a memory 508, and an operating system 510. The storage 504, the processor(s) 506, the memory 508, and the operating system 510 may be communicatively coupled over a communication infrastructure 512. Optionally, the computer system 502 may interact with a user, or environment, via input/output (I/O) device(s) 514, as well as one or more other computing devices over a network 516, via the communication infrastructure 512. The operating system 510 may interact with other components to control one or more applications 518.

As can be understood in the context of this disclosure, the computer system 502 can be implemented in an autonomous vehicle, a semi-autonomous vehicle, or any other vehicle.

In an example where the computer system is implemented in a vehicle, the computer system 502 can implement a variety of applications 518, components, and/or systems, including but not limited to a localization system, a perception system, a prediction system, a planning system, one or more system controllers, and the like.

In some instances, the localization system can determine where the vehicle is in relation to a local and/or global map based at least in part on sensor data received from the I/O device(s) 514.

In some instances, the perception system can process captured sensor data to perform entity detection, segmentation, and/or classification.

In some instances, the prediction system can receive sensor data and determinations from the perception system to determine predictions regarding entity behavior in an environment. For example, the prediction system can perform a look-up to determine a pattern of behavior associated with the detected entity in the particular location, or can extrapolate measured behavior to determine expected future behavior.

In some instances, the planning system can utilize the predicted entity behavior for determining a trajectory along which the vehicle can travel. Additionally and/or alternatively, the predicted entity behavior can be used for weighting trajectories generated by the planning system that can determine routes and/or trajectories to use to control the vehicle.

In some instances, the one or more controllers can be configured to control steering, propulsion, braking, safety, emitters, communication, and other systems of the vehicle.

In some instances, the computer system(s) 502 may implement (at least in part) the functions of the architecture 200, as discussed herein.

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions.

An exemplary environment and computerized system for implementing the systems and methods described herein is illustrated in FIG. 5. A processor or computer system can be configured to particularly perform some or all of the methods described herein. In some embodiments, the methods can be partially or fully automated by one or more computers or processors. The systems and methods described herein may be implemented using a combination of any of hardware, firmware, and/or software. The present systems and methods described herein (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the systems and methods described herein may be directed toward one or more computer systems capable of carrying out the functionality described herein. Example computing devices may be, but are not limited to, a personal computer (PC) system running any operating system such as, but not limited to, OS X™, iOS™, Linux™, Android™, and Microsoft™ Windows™ However, the systems and methods described herein may not be limited to these platforms. Instead, the systems and methods described herein may be implemented on any appropriate computer system running any appropriate operating system. Other components of the systems and methods described herein, such as, but not limited to, a computing device, a communications device, mobile phone, a smartphone, a telephony device, a personal computer (PC), a handheld PC, client workstations, thin clients, thick clients, proxy servers, network communication servers, remote access devices, client computers, server computers, routers, web servers, data, media, audio, video, telephony or streaming technology servers, etc., may also be implemented using a computing device.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disc drive CD-ROM, etc. The removable storage drive may read from and/or written to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disc read-only memory (CD-ROM) or a digital versatile disc (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise.

In alternative exemplary embodiments, secondary memory may include other similar devices for allowing computer programs or other instructions to be loaded into a computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket), and other removable storage units and interfaces, which may allow software and data to be transferred from the removable storage unit to computer system.

The computing device may also include an input device such as, but not limited to, a voice input device, such as a microphone, touch screens, gesture recognition devices, such as cameras, other natural user interfaces, a mouse or other pointing device such as a digitizer, and a keyboard or other data entry device. The computing device may also include output devices, such as but not limited to, a display, and a display interface. The computing device may include input/output (I/O) devices such as but not limited to a communications interface, cable and communications path, etc. These devices may include, but are not limited to, a network interface card, and modems. Communications interface(s) may allow software and data to be transferred between a computer system and one or more external devices.

In one or more embodiments, the computing device may be operatively coupled to an automotive system. Such automotive system may be either manually operated, semi-autonomous, or fully autonomous. In such an embodiment, input and output devices may include one or more image capture devices, controllers, microcontrollers, and/or other processors to control automotive functions such as, but not limited to, acceleration, braking, and steering. Further, communication infrastructure in such embodiments may also include a Controller Area Network (CAN) bus.

In one or more embodiments, the computing device may be operatively coupled to any machine vision based system. For example, such machine based vision systems include but are not limited to manually operated, semi-autonomous, or fully autonomous industrial or agricultural robots, household robot, inspection system, security system, etc. That is, the embodiments described herein are not limited to one particular context and may be applicable to any application utilizing machine vision.

In one or more embodiments, the present embodiments can be practiced in the environment of a computer network or networks. The network can include a private network, or a public network (for example the Internet, as described below), or a combination of both. The network may include hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include nodes, which may include hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as modem cell phones with processing capability, wireless email devices including BlackBerry™ devices), or complex entities (such as local-area networks or wide area networks) to which are connected a collection of processors, as described. For example, in the context of the present disclosure, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present disclosure may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™ JAVA™, C++, C, C #, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The systems and methods described herein may be directed to such computer program products.

References to "one embodiment," "an embodiment," "example embodiment," "various embodiments," etc., may indicate that the embodiment(s) of the present disclosure may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may. Similarly, references to "instances" may indicate that various instance(s) of the present disclosure may include a particular feature, structure, or characteristic, but not every instance necessarily includes the particular feature, structure, or characteristic. Further, repeated use of the phrase "in some instances" does not necessarily refer to the same instance, although it may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some implementations the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Example Clauses

A. A system comprises: one or more processors; and one or more computer-readable media storing instructions executable by the one or more processors, wherein the instructions program the one or more processors to: receive image data captured by at least one image sensor of an autonomous vehicle, the image data including a plurality of pixels; determine a depth estimate associated with a pixel of the plurality of pixels using a machine learned algorithm, the depth estimate providing an indication of a distance between the at least one image sensor and an object represented by the pixel; determine a confidence value associated with the depth estimate using the machine learned algorithm; and generate a trajectory for the autonomous vehicle based at least in part on the image data, the depth estimate, and the confidence value.

B. A system as paragraph A recites, wherein the instructions, when executed by the one or more processors, further program the one or more processors to: determine depth estimates associated with each pixel of the plurality of pixels; and determine individual confidence values associated with each depth estimate.

C. The system as paragraph A or B recites, wherein the instructions, when executed by the one or more processors, further program the one or more processors to: receive depth data from at least one LIDAR sensor of the autonomous vehicle; and determine the depth estimate associated with the pixel based at least in part on the depth data.

D. The system as paragraph C recites, wherein the instructions, when executed by the one or more processors, further program the one or more processors to: receive, for each pixel of the plurality of pixels, a depth value indicator indicating whether the depth data exists for each pixel, wherein the depth value indicator is based at least in part on a transformation of the depth data into a reference frame of the image data.

E. The system as any one of paragraphs A-D recite, wherein the instructions, when executed by the one or more processors, further program the one or more processors to: receive training image data captured by the at least one image sensor of the autonomous vehicle, the training image data including a first plurality of data points; receive ground truth data captured by at least one depth sensor of the autonomous vehicle, the ground truth data including a second plurality of data points, wherein the second plurality of data points includes fewer data points than the first plurality of data points; and train a convolutional neural network using the training image data and at least a portion of the ground truth data to determine the machine learned algorithm.

F. The system as paragraph E recites, wherein the instructions, when executed by the one or more processors, further program the one or more processors to: cluster the ground truth data into a plurality of clusters; and select a first portion of clusters as input depth data for training the convolutional neural network, wherein the first portion of clusters represents a subset of the ground truth data.

G. The system as paragraph E recites, wherein at least one of the image data, the training image data, or the ground truth data includes simulated data.

H. The system as any one of paragraph A-G recite, wherein the instructions, when executed by the one or more processors, further program the one or more processors to: determine the depth estimate based at least in part on a rectified linear unit (ReLU) activation function; and determine the confidence value based at least in part on a sigmoid activation function.

I. A method comprises: receiving image data captured by at least one image sensor, the image data including a plurality of pixels; determining a depth estimate associated with a pixel of the plurality of pixels using an algorithm, the depth estimate providing an indication of a distance between a first point associated with the at least one image sensor and an object represented by the pixel; determining a confidence value associated with the depth estimate using the algorithm; and providing the image data, the depth estimate, and the confidence value to at least one of a perception system or a planning system of an autonomous vehicle.

J. The method as paragraph I recites, further comprising: receiving depth data from at least one LIDAR sensor; and determine the depth estimate associated with the pixel based at least in part on the depth data.

K. The method as paragraph J recites, further comprising: receiving, for each pixel of the plurality of pixels, a depth value indicator indicating whether the depth data exists for each pixel, wherein the depth value indicator is based at least in part on a transformation of the depth data into a reference frame of the image data.

L. The method as paragraph J recites, wherein the depth data is a sparse data set relative to a number of the plurality of pixels associated with the image data.

M. The method as any one of paragraph I-L recite, further comprising: determining depth estimates associated with each of the plurality of pixels; and determining individual confidence values associated with each depth estimate.

N. The method as any one of paragraph I-M recite, wherein the algorithm is a machine learned algorithm, the method further comprising: receiving training image data from the at least one image sensor, the training image data including a first plurality of data points; receiving ground truth data from at least one depth sensor, the ground truth data including a second plurality of data points; and training a convolutional neural network using the training image data and at least a portion of the ground truth data to determine the machine learned algorithm.

O. The method as any one of paragraph I-N recite, further comprising: clustering the ground truth data into a plurality of clusters; and selecting a first portion of clusters as input depth data for training the convolutional neural network, wherein the first portion of clusters represents a subset of the ground truth data.

P. The method as any one of paragraph I-O recite, further comprising: determining the depth estimate based at least in part on a rectified linear unit (ReLU) activation function; and determining the confidence value based at least in part on a sigmoid activation function.

Q. A non-transitory computer-readable medium having a set of instructions that, when executed, cause one or more processors to perform operations comprising: receiving image data captured by at least one image sensor, the image data including a plurality of image elements; determining a depth estimate associated with an image element of the plurality of image elements, the depth estimate providing an indication of a distance between a first point associated with the at least one image sensor and an object represented by the image element; determining a confidence value associated with the depth estimate; and providing the image data, the depth estimate, and the confidence value to at least one of a perception system or a planning system of an autonomous vehicle.

R. The non-transitory computer-readable medium as paragraph Q recites, the operations further comprising: receiving depth data from at least one LIDAR sensor; and determine the depth estimate associated with the image element based at least in part on the depth data.

S. The non-transitory computer-readable medium as paragraph R recites, the operations further comprising: determining, for each image element of the plurality of image elements, a depth value indicator indicating whether the data exists for each pixel, wherein the depth value indicator is based at least in part on a transformation of the depth data into a reference frame of the image data.

T. The non-transitory computer-readable medium as any one of paragraph Q-S recite, the operations further comprising: receiving training image data from the at least one image sensor, the training image data including a first plurality of data points; receiving ground truth data from at least one depth sensor, the ground truth data including a second plurality of data points; training a convolutional neural network using the training image data and at least a portion of the ground truth data; and determining the depth estimate and the confidence value based at least in part on the convolutional neural network.

While the example clauses described above are described with respect to one particular implementation, it should be understood that, in the context of this document, the content of the example clauses can also be implemented via a method, device, system, and/or computer-readable medium.

What is claimed is:

1. A system comprising:
one or more processors; and
one or more computer-readable media storing instructions executable by the one or more processors, wherein the instructions program the one or more processors to:
receive image data captured by at least one image sensor of an autonomous vehicle, the image data including a plurality of pixels;
determine a depth estimate associated with a pixel of the plurality of pixels using a machine learned algorithm, the depth estimate providing an indication of a distance between the at least one image sensor and an object represented by the pixel;
determine a confidence value associated with the depth estimate using the machine learned algorithm; and
generate a trajectory for the autonomous vehicle based at least in part on the image data, the depth estimate, and the confidence value,
wherein the machine learned algorithm is trained based at least in part by:
receiving a first plurality of data points;
receiving ground truth data captured by at least one depth sensor of the autonomous vehicle, the ground truth data including a second plurality of data points, wherein the second plurality of data points comprises fewer data points than the first plurality of data points;
clustering the ground truth data into a plurality of clusters; and
determining a first portion of clusters as input depth data for training, wherein the first portion of clusters represents a subset of the ground truth data.

2. The system of claim 1, wherein the instructions, when executed by the one or more processors, further program the one or more processors to:
determine depth estimates associated with each pixel of the plurality of pixels; and
determine individual confidence values associated with each depth estimate.

3. The system of claim 1, wherein the instructions, when executed by the one or more processors, further program the one or more processors to:
receive depth data from at least one LIDAR sensor of the autonomous vehicle; and
determine the depth estimate associated with the pixel based at least in part on the depth data.

4. The system of claim 3, wherein the instructions, when executed by the one or more processors, further program the one or more processors to:
receive, for each pixel of the plurality of pixels, a depth value indicator indicating whether the depth data exists for each pixel,
wherein the depth value indicator is based at least in part on a transformation of the depth data into a reference frame of the image data.

5. The system of claim 1, wherein the machine learned algorithm comprises a convolutional neural network, and wherein
the first plurality of data points is determined based at least in part on training image data received from the at least one image sensor.

6. The system of claim 5, wherein at least one of the image data, the training image data, or the ground truth data includes simulated data.

7. The system of claim 1, wherein the instructions, when executed by the one or more processors, further program the one or more processors to:
determine the depth estimate based at least in part on a rectified linear unit (ReLU) activation function; and
determine the confidence value based at least in part on a sigmoid activation function.

8. A method comprising:
receiving image data captured by at least one image sensor, the image data including a plurality of pixels;
determining a depth estimate associated with a pixel of the plurality of pixels using an algorithm, the depth estimate providing an indication of a distance between a first point associated with the at least one image sensor and an object represented by the pixel;
determining a confidence value associated with the depth estimate using the algorithm; and
providing the image data, the depth estimate, and the confidence value to at least one of a perception system or a planning system of an autonomous vehicle,
wherein the algorithm is a machine learned algorithm trained based at least in part by:
receiving a first plurality of data points;
receiving ground truth data from at least one depth sensor, the ground truth data including a second plurality of data points;
clustering the ground truth data into a plurality of clusters; and
determining a first portion of clusters as input depth data for training, wherein the first portion of clusters represents a subset of the ground truth data.

9. The method of claim 8, further comprising:
receiving depth data from at least one LIDAR sensor; and
determine the depth estimate associated with the pixel based at least in part on the depth data.

10. The method of claim 9, further comprising:
receiving, for each pixel of the plurality of pixels, a depth value indicator indicating whether the depth data exists for each pixel,
wherein the depth value indicator is based at least in part on a transformation of the depth data into a reference frame of the image data.

11. The method of claim 10, wherein the depth data is a sparse data set relative to a number of the plurality of pixels associated with the image data.

12. The method of claim 8, further comprising:
determining depth estimates associated with each of the plurality of pixels; and
determining individual confidence values associated with each depth estimate.

13. The method of claim 8, wherein the algorithm comprises a convolutional neural network, and
wherein the first plurality of data points is determined based at least in part on training image data received from the at least one image sensor.

14. The method of claim 8, further comprising:
determining the depth estimate based at least in part on a rectified linear unit (ReLU) activation function; and
determining the confidence value based at least in part on a sigmoid activation function.

15. A non-transitory computer-readable medium having a set of instructions that, when executed, cause one or more processors to perform operations comprising:
- receiving image data captured by at least one image sensor, the image data including a plurality of image elements;
- determining a depth estimate associated with an image element of the plurality of image elements using a machine learned algorithm, the depth estimate providing an indication of a distance between a first point associated with the at least one image sensor and an object represented by the image element;
- determining a confidence value associated with the depth estimate; and
- providing the image data, the depth estimate, and the confidence value to at least one of a perception system or a planning system of an autonomous vehicle,
- wherein the machine learned algorithm is trained based at least in part by:
  - receiving a first plurality of data points;
  - receiving ground truth data from at least one depth sensor, the ground truth data including a second plurality of data points;
  - clustering the ground truth data into a plurality of clusters; and
  - determining a first portion of clusters as input depth data for training, wherein the first portion of clusters represents a subset of the ground truth data.

16. The non-transitory computer-readable medium of claim 15, the operations further comprising:
- receiving depth data from at least one LIDAR sensor; and
- determine the depth estimate associated with the image element based at least in part on the depth data.

17. The non-transitory computer-readable medium of claim 16, the operations further comprising:
- determining, for each image element of the plurality of image elements, a depth value indicator indicating whether the data exists for each pixel,
- wherein the depth value indicator is based at least in part on a transformation of the depth data into a reference frame of the image data.

18. The non-transitory computer-readable medium of claim 15, wherein the machine learned algorithm comprises a convolutional neural network, and
- wherein the first plurality of data points is determined based at least in part on training image data received from the at least one image sensor.

19. The system of claim 3, wherein the depth data is a sparse data set relative to a number of the plurality of pixels associated with the image data.

20. The non-transitory computer-readable medium of claim 16, wherein the depth data is a sparse data set relative to a number of the plurality of image elements associated with the image data.

* * * * *